UNITED STATES PATENT OFFICE 2,372,092

PREPARATION OF VITAMIN INTERMEDIATE

Elmer J. Lawson and Hervey C. Parke, Detroit, Mich., assignors to Parke, Davis & Company, Detroit, Mich., a corporation of Michigan No Drawing. Original application August 18, 1941, Serial No. 407,358. Divided and this application May 11, 1942, Serial No. 442,538

4 Claims. (Cl. 260—534)

The invention relates to the preparation of certain chemical compounds useful as intermediates in the preparation of pantothenic acid, a vitamin of the B complex, and derivatives thereof.

This application is a division of our copending application, Serial No. 407,358, filed August 18, 1941.

More particularly this application relates to an improved process for the preparation of $\beta$-alanine which eliminates the necesity for using costly reagents and complex isolation procedures. The new method of this invention consists in precipitating $\beta$-alanine from a solution of a $\beta$-alanine acid addition salt in a lower aliphatic alcohol by adding to the solution an excess of a base of ionization constant between $4 \times 10^{-8}$ and $4 \times 10^{-4}$, and separating the $\beta$-alanine thus liberated.

The obtainment of $\beta$-alanine acid addition salts in alcoholic solutions does not of itself offer any difficulties and procedures for obtaining such solutions are well known. For example, cyanoacetic acid, or its esters, etc., may be reduced, for example, catalytically hydrogenated in the presence of an acid, and the solution evaporated to dryness. On dissolving the residue in methanol, ethanol or isopropanol and filtering, there is obtained an alcoholic solution of the $\beta$-alanine acid addition salt. According to our invention, we obtain the $\beta$-alanine therefrom by the addition of a basic substance having its ionization constant between $4 \times 10^{-8}$ and $4 \times 10^{-4}$. The $\beta$-alanine which separates after some standing is readily separated and purified.

It will be appreciated that this method is considerably simpler and cheaper than methods previously used in the art, such as separations by means of barium hydroxide, lead oxide or silver oxide.

Instead of preparing the alcoholic solution of the $\beta$-alanine acid addition salt as described above, this solution may be prepared according to numerous other methods, for example, by the Hofmann degradation of succinimide, as hereinafter described.

We have found the following bases to be especially suitable for the precipitation of $\beta$-alanine as described above: diethanolamine, ethanolamine, N-morpholinoethanol. N-ethylmorpholine, collidine, and 2-amino-2-ethyl-1,3-propanediol. We have also found triethanolamine to be a satisfactory agent for precipitating $\beta$-alanine from alcoholic solutions of $\beta$-alanine sulfates or other $\beta$-alanine oxy-acid addition salts. However, triethanolamine is not suitable for precipitating $\beta$-alanine from solutions of its hydrohalides; since the sparingly soluble triethanolamine hydrohalides are precipitated simultaneously.

Also we have found that morpholine is a satisfactory precipitant in the absence of succinic acid, but is not a suitable precipitant when the $\beta$-alanine is obtained by the Hofmann method from succinimide because in this case the succinic acid present in the alcoholic extracts is precipitated as a morpholine addition compound.

The following is a specific example of the invention:

A solution of 302 g. of potassium hydroxide in 2700 cc. of water is cooled to 5° C., and 30.8 cc. of bromine added with good stirring over a period of fifteen minutes. With the stirring being continued, 59.4 g. of fine granular succinimide is then added. The clear solution is warmed to 45° C. for an hour to complete the reaction, cooled, and made acidic to Congo red with 380 cc. of conc. hydrochloric acid. The mixture is then concentrated to a volume of 500 cc. and diluted with an equal amount of methanol. The precipitated salts are removed by filtration, washed well with methanol, and the combined filtrate and washings evaporated to dryness. The residue is extracted successively with 200, 100, and 50 cc. of methanol, and the combined extracts filtered. To the filtrate is added 55 cc. of diethanolamine, and the mixture was placed in a refrigerator. After several days the $\beta$-alanine, which separates slowly, is collected and recrystallized from water-methanol; M. P. 199–201°.

What we claim as our invention is:

1. Process for obtaining $\beta$-alanine which comprises adding an excess of a base of ionization constant between $4 \times 10^{-8}$ and $4 \times 10^{-4}$ to a solution of a $\beta$-alanine acid addition salt in a lower aliphatic alcohol, said base being capable of forming the corresponding acid addition salt readily soluble in said lower aliphatic alcohol, and collecting the precipitated $\beta$-alanine.

2. Process for obtaining $\beta$-alanine which comprises adding to a solution of a $\beta$-alanine acid addition salt in a lower aliphatic alcohol, an organic base selected from the class consisting of diethanolamine, ethanolamine, N-morpholinoethanol, N-ethylmorpholine, collidine, and 2-amino-2-ethyl-1,3-propanediol, and collecting the precipitated $\beta$-alanine.

3. Process for obtaining $\beta$-alanine which comprises adding to a solution of a $\beta$-alanine hydrohalide in a lower aliphatic alcohol an excess of a base of ionization constant between $4 \times 10^{-8}$ and $4 \times 10^{-4}$, said base being capable of forming a hydrohalide readily soluble in said lower aliphatic alcohol, and collecting the precipitated β-alanine.

4. In a process for preparing β-alanine by reacting succinimide with an aqueous solution of an alkali hydroxide and a member of the class consisting of water-soluble hypochlorites and water-soluble hypobromites, acidifying the reaction mixture with a strong mineral acid, concentrating the solution, diluting with a lower aliphatic alcohol and filtering from precipitated salts, evaporating the filtrate to a pasty consistency, and extracting the paste with a lower aliphatic alcohol, the steps comprising adding to this alcoholic extract an organic base selected from the class consisting of diethanolamine, ethanolamine, N-morpholinoethanol, N-ethylmorpholine, collidine, and 2-amino-2-ethyl-1,3-propanediol, and collecting the β-alanine.

ELMER J. LAWSON.
HERVEY C. PARKE.